Figure 1:
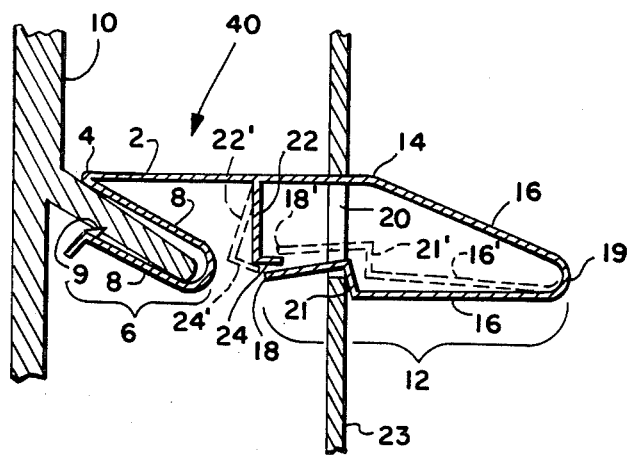

United States Patent [19]

Oehlke

[11] Patent Number: 4,683,622
[45] Date of Patent: Aug. 4, 1987

[54] RELEASABLE FASTENER

[75] Inventor: Donald N. Oehlke, Troy, Mich.

[73] Assignee: Eaton Corporation, Cleveland, Ohio

[21] Appl. No.: 836,870

[22] Filed: Mar. 6, 1986

[51] Int. Cl.⁴ .............................................. A44B 21/00
[52] U.S. Cl. ...................................... 24/458; 24/295; 24/297; 52/511
[58] Field of Search ................. 24/458, 289, 292–297, 24/336, 453, 7; 52/401, 489, 511, 712, 581, 582; 403/322, 326, 407.1, 405.1, 406.1; 411/520, 548, 112; 248/27.3

[56] References Cited

U.S. PATENT DOCUMENTS

| | | | |
|---|---|---|---|
| 2,137,652 | 11/1938 | Lundberg | 24/458 |
| 2,471,247 | 5/1949 | Stadler | 24/295 |
| 3,971,908 | 7/1976 | Piber | 248/27.3 X |
| 4,149,353 | 4/1979 | Adams | 52/489 |
| 4,393,560 | 7/1983 | Kato | 24/295 |
| 4,438,552 | 3/1984 | Omata | 24/297 X |

FOREIGN PATENT DOCUMENTS

| | | | |
|---|---|---|---|
| 2236766 | 2/1974 | Fed. Rep. of Germany | 24/297 |
| 1234649 | 10/1960 | France | 24/294 |
| 1131002 | 9/1963 | France | 24/295 |

Primary Examiner—Peter A. Aschenbrenner
Assistant Examiner—Laurie K. Cranmer
Attorney, Agent, or Firm—D. A. Rowe; A. E. Chrow

[57] ABSTRACT

A releasable fastener (40) is provided that includes a base member (2) having a compressible portion (12) at one end adapted to be inserted into an opening in a panel or the like when compressed and to secure the fastener to the panel upon expansion and having means such as an open ended portion (6) extending from an opposite end thereof adapted to secure an article to the fastener as well as including a latch means (22) extending from body member (2) for engaging portion 12 and holding it in a compressed state to facilitate simultaneous removal of fasteners (40) from the panel opening when a plurality of such fasteners are involved.

5 Claims, 1 Drawing Figure

U.S. Patent

Aug. 4, 1987

4,683,622

RELEASABLE FASTENER

INTRODUCTION

This invention relates generally to a fastener having a compressible arm for releasably securing an object to an article such as a plate and more particularly to a fastener having means engageable to change and hold the arm in a compressed state while the arm is in an expanded state within an opening in the article.

BACKGROUND OF THE INVENTION

The prior art is replete with numerous fasteners adapted to be inserted into an opening in an article such as a plate for holding an object thereto. Such fasteners, commonly called "dart" fasteners, are characteristically provided with a compressible portion that, when compressed, is able to be inserted into an opening in the article and thence able to expand against opposed edges of the opening with sufficient force to hold the fastener to the article.

Examples of such fasteners are disclosed in U.S. Pat. Nos. 3,279,729; 3,303,542; 3,525,129; 3,605,846; 3,916,755 and 3,959,852, the disclosures of which are incorporated herein by reference.

None of such prior art fasteners, however, have been provided with a compressible portion that is able to be changed from an expanded state to a compressed state or vice-versa while the portion remains in the opening without having to employ a separate number such as a threaded screw or the like to provide such effect.

The ability to be able to releasably hold the arm of the fastener in a compressed state while the arm remains inserted in the article opening can be used to advantage for example where a plurality of such fasteners are used to hold a vehicle grill to the vehicle frame where, rather than having to remove each fastener separately from the opening in the frame to which it is secured, the compressible portions of all of the fasteners are able to be compressed and held in a compressed state while in the opening and thence enabling convenient removal of the grill and all of the fasteners at one time and, also for their subsequent insertion into their respective openings at one time and thence their subsequent expansion for holding the grill to the frame.

SUMMARY OF THE INVENTION

Accordingly, it is an object of this invention to provide a fastener for releasably securing an object to an article.

It is another object of this invention to provide a fastener having a compressible portion adapted to be inserted into an opening and thence expanded to hold the fastener to the article.

It is a further object of this invention to provide a fastener having a compressible portion that when expanded is able to engage opposed edges of an opening in an article that is able to be converted from the expanded state to a compressed state for removal while the portion is in the expanded state securing the fastener to the article and vice-versa.

BRIEF DESCRIPTION DRAWING

FIG. 1 shows a side elevation view of an embodiment of the fastener of the invention.

DESCRIPTION OF SOME PREFERRED EMBODIMENTS

Fastener 40 of the invention shown in FIG. 1 is provided with a base member 2 having generally referenced fastening means 6 adapted to secure fastener 40 to an object 10 at end 4 of base member 2. Means 6 comprises a resilient arm 8 that extends away from end 4 to a free-end and shaped into an open-ended clip that is dimensionally adapted to receive and resiliently secure object 10 to fastener 40 and which may include means such as one or more barbs 9 for enhancing the securement of object 10 to fastener 40 where such is suitable. Object 10 may for example be a part of a vehicular grill as previously described.

Although shown in the form of an open ended clip, it is to be understood that the means for securing fastener 40 to an object may be any means that enables securement of fastener 40 to an object.

A compressible portion of fastener 40 in the form of resiliently compressible arm 16 extends away from opposite end 14 of base member 2 and thence curves reversedly towards base member 2 at curve 19 to a free-end 18 thereof that is in spaced-apart relationship to base member 2.

Fastener 40 includes latching means extending from base member 2 and operable to engage free-end 18 of compressible arm 16 and hold arm 16 in a compressed state shown in dashed form as arm 16' and free end 18'. Latching means 22 is operable to be disengaged from free-end 18 as shown in dashed form as 22' which then enables arm 16 to expand to the expanded state shown in solid line in FIG. 1.

Compressible arm 16 is dimensionally adapted to be inserted into opening 20 of article 23 such as a vehicular frame when in the compressed state and to expand against opposed edges (not referenced) of opening 20 with sufficient force to secure fastener 40 to article 23. Arm 16 is further dimensionally adapted such that latching means 22 is operable to be engaged with and to be disengaged from free-end 18 of arm 16 while arm 16 is within opening 20 of article 23 and securing fastener 40 to article 23. Arm 16 may further include a step adjacent free-end 18 such as step 21 shown in the expanded state in FIG. 1 and step 21' shown in the compressed state in FIG. 1 which, in the expanded state, is adapted to enhance the securement of fastener 40 to article 23 by engaging the side of opening 20 facing away from latching means 22.

Latching means 22 is accessible to free-end 18 of arm 16 while arm 16 is in the expanded state within opening 20 and preferably comprises a resilient arm provided with a free-end 24 (referenced s 24' in the compressed state) which is adapted to engage a side of arm 16 adjacent free-end 18 facing away from base member 2. Generally, enough of free-end 18 of arm 16 is exposed on the side of opening 20 into which arm 16 is inserted to enable one to compress arm 16 and engage latching means 22 to hold it in the compressed state while arm 16 is within opening 20.

It can readily be seen then that while arm 16 is in the expanded state within opening 20 securing fastener 40 to article 23, one is able to compress arm 16 and engage free-end 18 of arm 16 with free-end 24 of latching means 22 and hold arm 16 in the compressed state until such time as free-end 24 is disengaged from free-end 18 to enable arm 16 to expand into the expanded state.

As previously described, the releasable engaging latching means 22 enables the resilient arms 16 of a plurality of fasteners 40 to be changed from an expanded state to a compressed or contracted state while the respective arms 16 remain within respective openings 20 in article 23 enabling all of them to be removed at one time while still being secured to object 10.

Although the fastener of the invention may be made from any resilient material suitable for the particular application intended in combination with the compressive and expanding characteristics desired, it is preferably made from a suitably resilient sheet metal such as spring steel having suitable thickness for the particular application intended and even more preferably is made as a one-piece construction such as by stamping and the like.

What is claimed is:

1. A fastener comprising a base member, means disposed at an end of the base member for securing the fastener to an object, a resilient compressible arm extending away from an opposite end of the base member and thence curving reversedly toward the base member to a free-end thereof that is in spaced-apart relationship thereto, said arm dimensionally adapted such that in a compressed state said arm is able to be inserted into an opening in an article and in an expanded state said arm is able to expand against opposed edges of said opening sufficiently to secure the fastener thereto with said free-end exposed sufficiently on the side of the opening into which said arm is inserted to enable the compression thereof, and latching means extending from the base member and accessible to the compressible arm free-end while said arm is in the expanded state within the opening securing the fastener to the article, said latching means operable to releasably engage said compressible arm free-end upon the compression thereof while said arm is within said opening and hold said arm in the compressed state until the release thereof from said latching means.

2. The fastener of claim 1 wherein the compressible arm includes a step adjacent the free-end thereof adapted to engage a side of the article opening facing away from the latching means to enhance securement between the article and the fastener thereto when said arm is in said expanded state.

3. The fastener of claim 1 wherein said latching means has a free-end that is shaped to releasably engage a side of the compressible arm free-end facing away from the base member.

4. The fastener of claim 1 wherein the means for securing the object to the fastener comprises an open-ended clip adapted to receive the object into the open-end thereof and secure the object to the fastener.

5. The fastener of claim 1 having a one-piece construction.

* * * * *